Oct. 24, 1967  R. HADEKEL  3,348,257
WINDSCREEN WIPERS
Filed Aug. 18, 1965  2 Sheets-Sheet 1
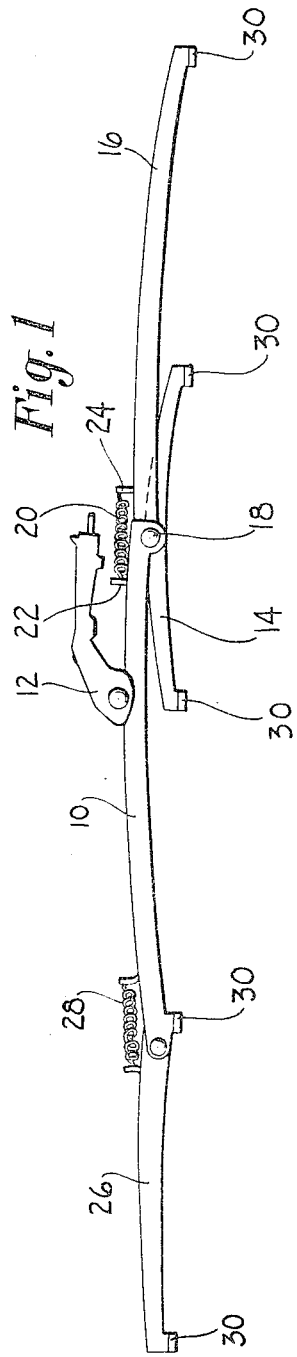
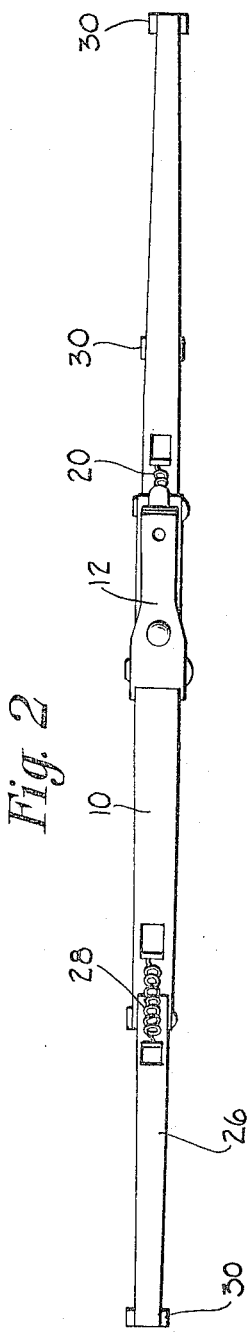
INVENTOR.
RUBEN HADEKEL
BY
E. H. Liss
ATTORNEY.

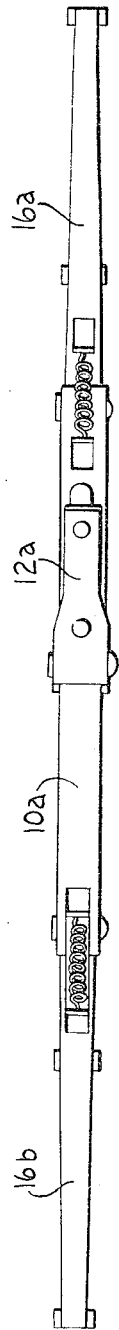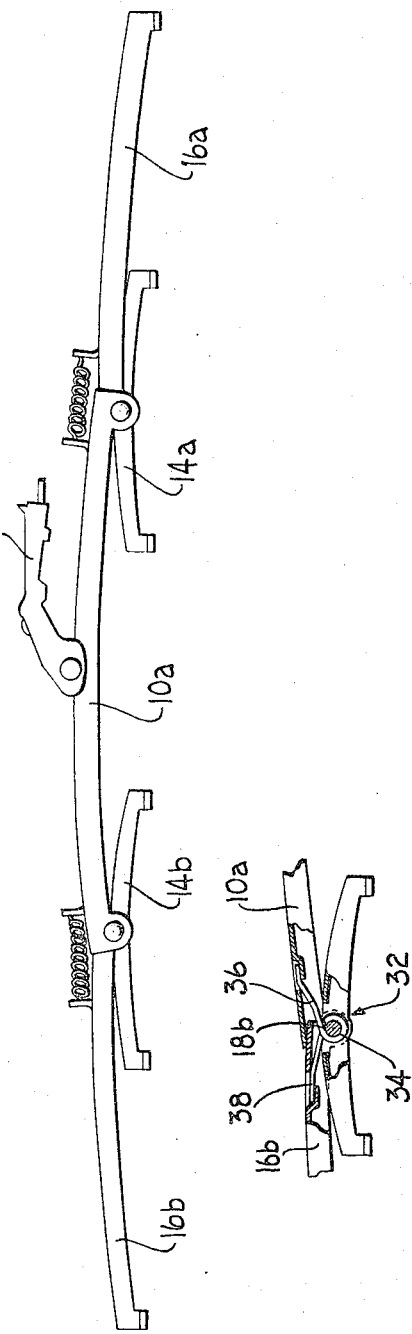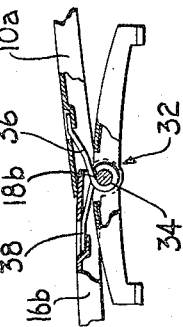

United States Patent Office 3,348,257
Patented Oct. 24, 1967

3,348,257
WINDSCREEN WIPERS
Ruben Hadekel, London, England, assignor to Trico
Products Corporation, Buffalo, N.Y.
Filed Aug. 18, 1965, Ser. No. 480,619
Claims priority, application Great Britain, Aug. 18, 1964,
33,706/64
3 Claims. (Cl. 15—250.42)

This invention is concerned with the harness of a windscreen wiper blade, that is to say the part which transmits pressure from the wiper arm to the wiping rubber, usually via a backing strip which stiffens them in a plane parallel to the windscreen while permitting it to flex readily into conformity with the varying curvatures of the windscreen.

The harness commonly consists basically of a primary yoke which has at a point between its ends a clip or other means for attachment to the end of a wiper arm. At least one end of the primary yoke is pivoted to a secondary yoke at a point lying between the ends of the secondary yoke, and the ends of the secondary yoke transmit pressure to the rubber either directly or through the backing strip.

According to the present invention, the harness includes a lever which is pivoted to the primary yoke at the end to which the secondary yoke is pivoted, the outer end of the lever being connected to the rubber or backing strip, and the lever being urged towards the rubber or backing strip by a spring so that the end of the rubber will receive its wiping pressure from the lever.

The primary yoke, secondary yoke and lever may all be pivoted together by a single pivot pin passing through all three members. The spring may be a torsion spring consisting of a coil surrounding the pivot pin, the arms engaging the primary yoke and lever respectively. Alternatively the spring may be a leaf spring or compression spring or may be any other kind arranged in an appropriate manner.

The primary yoke may have a secondary yoke and lever at both ends so that the harness as a whole has six points of attachment to the rubber.

The strength of the spring or springs may be such that equal forces are applied to the rubber at the various points of attachment between the harness and the rubber. Alternatively, the springs may be stronger or weaker so that the harness will apply a greater or lesser force at one end or at both ends of the rubber than at intermediate points. Various harnesses may be made with the same yokes but with different springs in order to give different pressure distribution characteristics.

The yokes and levers may be of metal or of plastic and may be of any desired cross-section. For example, they may be channel-shaped in cross-section, or each may be formed by one or more rods, the multi-rod construction being, for example, in accordance with British Patent No. 940,214.

Examples of windscreen wiper harnesses according to this invention are shown in the accompanying drawings.

In these drawings:

FIGURE 1 is a side view of a first harness;
FIGURE 2 is a plan view of the first harness;
FIGURE 3 is a side view of a second harness;
FIGURE 4 is a plan view of the second harness; and
FIGURE 5 is a fragmentary view showing an alternative form of spring.

The harness shown in FIGURES 1 and 2 includes a primary yoke 10 to which is pivoted a clip 12 for attachment to the end of a wiper arm. At the right-hand end of the primary yoke there is a secondary yoke 14 and a lever 16, both being pivoted to the primary yoke by means of a pin 18. A coil spring 20 acting in compression between two outwardly deflected lugs 22 and 24 urges the lever 16 in a clockwise direction about the pivot pin 18 so that the free end of the lever can apply the appropriate pressure to the end of a wiping rubber (not shown).

A second lever 26 is pivoted to the left-hand end of the primary yoke 10 and is urged in a counter-clockwise direction by a compression spring 28. The harness thus provides five sets of claws 30 for attachment to a wiper rubber or to a backing strip for the rubber. It will be seen that the five pairs of claws are evenly spaced along the harness. The strengths of the springs 20 and 28 may be such that the five pairs of claws apply equal forces to the rubber, or they may be chosen differently as required.

In the second harness, shown in FIGURES 3 and 4, the left-hand end of the primary yoke, instead of being formed with a pair of claws, carries both a lever and a further secondary yoke. Thus at each end of the primary yoke 10a there is a secondary yoke 14a, 14b, and a lever 16a, 16b. A clip 12a is connected to the primary yoke 10a at a point midway between its ends.

FIGURE 5 shows the use of a torsion spring 32 in place of compression springs 20a, 20b as shown in FIGURE 4. The coil 34 of the torsion spring encircles the pin 18b, and the arms 36, 38 engage depressed portions of the primary yoke 10a and the lever 16b respectively.

I claim:
1. A windscreen wiper harness comprising a primary yoke having between its ends means for attachment to the end of a wiper arm, a secondary yoke to which one end of the primary yoke is pivoted at a point lying between the ends of the secondary yoke, and a lever which is pivoted to the primary yoke at the end to which the secondary yoke is pivoted, the lever being urged about its pivot axis by means of a spring so that a free end of the lever can apply wiping pressure to the end of a wiping rubber.

2. A harness according to claim 1, in which the primary yoke, secondary yoke and lever are all pivoted together by a single pivot pin passing through all three members.

3. A harness according to claim 1, in which both ends of the primary yoke carry a secondary yoke and lever.

References Cited

UNITED STATES PATENTS 2,706,291   4/1955   Rappe _____ 15—250.42 X
2,901,761   9/1959   Wallie _____ 15—250.42

CHARLES A. WILLMUTH, *Primary Examiner.*